(12) United States Patent
Priebatsch

(10) Patent No.: US 10,853,835 B2
(45) Date of Patent: Dec. 1, 2020

(54) PAYMENT SYSTEM WITH ITEM-LEVEL PROMOTIONAL CAMPAIGNS REDEEMABLE AUTOMATICALLY AT POINT-OF-SALE DEVICES

(71) Applicant: SCVNGR, INC., Boston, MA (US)

(72) Inventor: Seth Priebatsch, Boston, MA (US)

(73) Assignee: SCVNGR, INC., Boston, MA (US)

( * ) Notice: Subject to any disclaimer, the term of this patent is extended or adjusted under 35 U.S.C. 154(b) by 334 days.

(21) Appl. No.: 15/389,606

(22) Filed: Dec. 23, 2016

(65) Prior Publication Data

US 2017/0193543 A1  Jul. 6, 2017

Related U.S. Application Data

(60) Provisional application No. 62/274,546, filed on Jan. 4, 2016.

(51) Int. Cl.
*G06Q 30/00*  (2012.01)
*G06Q 30/02*  (2012.01)
*G06Q 20/20*  (2012.01)
*G06Q 20/32*  (2012.01)

(52) U.S. Cl.
CPC ....... *G06Q 30/0238* (2013.01); *G06Q 20/202* (2013.01); *G06Q 20/3224* (2013.01)

(58) Field of Classification Search
None
See application file for complete search history.

(56) References Cited

U.S. PATENT DOCUMENTS

| | | | |
|---|---|---|---|
| 8,489,452 B1* | 7/2013 | Warner | G06Q 30/0226 705/14.38 |
| 9,864,983 B2* | 1/2018 | Ahn | G06Q 20/42 |
| 9,953,311 B2* | 4/2018 | Flurscheim | G06Q 20/3276 |
| 10,248,964 B1* | 4/2019 | Neemann | G06Q 30/0233 |
| 2007/0011044 A1* | 1/2007 | Hansen | G06Q 20/24 705/14.15 |
| 2007/0124209 A1* | 5/2007 | Walker | G06Q 30/0601 705/14.25 |
| 2007/0174614 A1* | 7/2007 | Duane | H04L 9/0833 713/168 |
| 2009/0254412 A1* | 10/2009 | Braswell | G06Q 10/00 705/7.29 |
| 2010/0100940 A1* | 4/2010 | Reynolds | H04L 61/00 726/4 |

(Continued)

OTHER PUBLICATIONS

Antirez, Generating unique IDs—an easy and reliable way, Nov. 26, 2015, antirez.com, printed through www.archive org (Year: 2015).*

*Primary Examiner* — Naresh Vig
(74) *Attorney, Agent, or Firm* — Hickman Palermo Becker Bingham LLP

(57) ABSTRACT

Retail merchants, third-party manufacturers, and/or distributors of retail goods market and distribute promotions to consumers based on the consumers' transaction histories (i.e., users that do not typically purchase a particular brand of soda) and/or award promotions to consumers targeted to a specific item, class or category of item, or characteristic of an item. The promotion redeems and is applied automatically to reduce the purchase amount when the consumer presents a payment method for a transaction for the purchase of a targeted item.

10 Claims, 4 Drawing Sheets

(56) References Cited

U.S. PATENT DOCUMENTS

| | | | |
|---|---|---|---|
| 2013/0060621 A1* | 3/2013 | Walker | G06Q 20/202 |
| | | | 705/14.23 |
| 2014/0019358 A1* | 1/2014 | Priebatsch | G06Q 20/322 |
| | | | 705/44 |
| 2014/0025457 A1* | 1/2014 | Martinez | G06Q 20/20 |
| | | | 705/14.23 |
| 2014/0081854 A1* | 3/2014 | Sanchez | G06Q 20/3223 |
| | | | 705/40 |

* cited by examiner

PAYMENT SYSTEM WITH ITEM-LEVEL PROMOTIONAL CAMPAIGNS REDEEMABLE AUTOMATICALLY AT POINT-OF-SALE DEVICES

RELATED APPLICATION

This application claims priority to and the benefits of U.S. Ser. No. 62/274,546, filed on Jan. 4, 2016, the entire disclosure of which is hereby incorporated by reference.

FIELD OF THE INVENTION

The inventions described herein relate generally to the field of payment systems and, more specifically, to systems and methods for facilitating the creation, distribution, advertising, delivery, redemption, transfer, tracking, and management of item-level promotional offers.

BACKGROUND

Today, promotion sponsors, such as manufacturers of consumer packaged goods ("CPG"), can create and distribute promotional offers (such as $2 off a bag of potato chips) or coupons to consumers, and the consumer can redeem the promotion by presenting the offer at a merchant's point of sale. Traditionally, such promotional campaigns require the consumer to display a paper or digital coupon having a bar code or other code identifying the promotion to a compatible merchant point-of-sale (POS) device, prior to and separate from the consumer's payment for the transaction. Distribution of these promotional rewards typically includes genetic and non-targeted publication, or may be achieved by communication to the consumer in connection with a single prior purchase (with a product registration initiated by the consumer), or through other known means of associating individuals with promotions.

These traditional methods of distribution, however, whether targeted or non-targeted, do not provide the promotion sponsor with the ability to target item-level promotions to users based on trends in data concerning items actually purchased (or not purchased) by an individual consumer over time, and further do not provide the promotion sponsor any ability to track the effectiveness of a promotional offer on an individual consumer's purchasing behavior for a period of time after the consumer's redemption of the promotional offer.

Known promotional systems and methods also fail to facilitate the redemption of item-level promotional offers automatically in a manner fully integrated with the consumer's payment, either at a merchant's point of sale or remotely (e.g., ahead of time in advance of a scheduled pick-up)), such as using a web browser or mobile app to initiate an order. Rather, existing systems and methods generally require the presentation of the promotional offer to the merchant prior to calculating the final amount of the payment due from the consumer at the time of purchase, and prior to the consumer's presentation of payment, either by cash or through some other means.

Another problem with known systems and methods is that, in many industries, including, for example, food service, there does not exist any uniform method across retail merchant POS systems and/or ordering management systems ("payment systems") for identifying and/or describing individual items in a merchant's retail offerings or menu. For example, a particular brand of soft drink on the menu of a restaurant might be classified differently within each merchant's payment system, making it difficult for third parties to direct promotional offers to individual items across various merchant locations and channels. As another example, within a single merchant payment system, a burrito with rice and cheese might be one SKU item, while a burrito with beans is another SKU item. At a competing merchant, a burrito with rice and cheese and beans might be four separate SKU numbers, one for each ingredient. Tied to this deficiency is the failure of conventional systems to offer a way to "normalize" data across merchants—that is, to track when a promotional trigger occurs and whether the consumer takes advantage of it at different merchant sites. The diversity of item-level identifications means that the same trigger may be satisfied by different item-level criteria at different merchants, and the item redeemed may similarly be different. Without the ability to achieve item-level consistency (i.e., to normalize) across merchants, it is impossible to reliably assess the success and economics of a promotion involving more than a single merchant.

Known promotional systems and methods also fail to facilitate the automatic redemption of dynamic item-level promotional offers, such as offers that become redeemable only after some purchasing behavior trigger is satisfied, such as the purchase of ten identified items, or the purchase of two items in combination, or after certain other triggering events, such as the tenth item sold by a merchant that day. Known systems and methods also fail to allow the sponsor of the promotion to message a consumer when a consumer enters or is in proximity to a location where the promotion can be redeemed. Known systems and methods also fail to provide a customer-friendly user interface for resolving consumer disputes concerning the application of a promotional offer to a purchased item.

Typical promotional methods and systems for targeting individual items of the promotion sponsor require complicated payment systems in order to facilitate the movement of funds from the promotion sponsor to the merchant seller of the individual items for which the promotional offer was applied.

As used herein, the term "promotion" or "promotional offer" broadly connotes any offer or benefit conferred on a user or consumer, and whose redemption is or can be associated with the offer for tracking purposes (e.g., to monitor the effectiveness of the offer, the receptiveness of a particular user (or users of a particular appliance) to offers, etc.).

A need therefore exists for a customizable, flexible approach that allows promotion sponsors, including third-party promotion sponsors that do not sell retail goods or services direct to consumers at physical or online retail locations, to create and distribute targeted promotional offers for consumers directed to individual items, goods, or services, or categories of same; to select recipients of the promotional offers based on data concerning items actually purchased (or not purchased) by the individual consumer at various retail locations or channels over time in the past; to permit an individual consumer to receive and redeem the promotion electronically; to permit the consumer to redeem the promotion automatically and in a manner integrated with the consumer's presentation of payment for the targeted item and/or other items; to provide uniformity in classification and/or labeling of items across merchant payment systems so as to permit third parties to direct promotional offers to individual items across various merchant locations and channels, and to normalize data relating to promotion triggers and fulfillment across merchants; to enable third parties to create dynamic promotions such as promotions that become redeemable automatically upon some action by the consumer, such as prior purchase or series of purchase, or upon some event outside the consumer's control; to message a consumer's mobile device when the device is in proximity to a location where the promotion can be redeemed; to permit error-correction in connection with an electronic receipt when the consumer believes that a promotion failed to be applied to transaction in error; to track the effect of a promotional offer's redemption on the consumer's future purchasing behavior of the targeted item and/or other items at various retail locations and channels over time; and/or, if the promotion sponsor is a third-party that does not sell the item at retail location or channel, to facilitate the movement of funds equal to the amount of the promotion redeemed by the consumer between the promotion sponsor and the redeeming retail merchant.

SUMMARY

The inventions described herein, in various embodiments, permit retail merchants, third-party manufacturers, and/or distributors of retail goods to market and distribute promotions to consumers based on the consumers' transaction histories (i.e., users that do not typically purchase a particular brand of soda) and/or to award promotions to consumers targeted to a specific item, class or category of item, or characteristic of an item, wherein such promotion redeems and is applied automatically to reduce the purchase amount when the consumer presents a payment method for a transaction for the purchase of a targeted item. Payment may be made in person via a merchant POS system or remotely, e.g., via an order-in-advance payment system that facilitates prepayment for subsequent pick-up.

Certain embodiments provide a transaction platform or transaction system, including transaction servers and web servers and related components, and in communication with merchant retail POS terminal devices and related components, third-party servers and related devices, including financial payment network servers and ordering servers, and consumer computing and mobile devices and related components, and necessary software and/or web applications, via existing communications networks, arranged to facilitate a fully customizable and interactive electronic payments network that may be leveraged by consumers, merchants, suppliers, manufacturers, and third parties to engage in the creation, distribution, receipt, redemption, and/or tracking of item-level promotional offers targeted to individual consumers based on the consumer's actual past item-level purchase activity.

In addition, certain of the embodiments of the inventions described herein provide a central transaction platform or system that facilitates the synchronization of labels and classifications used by various unaffiliated retail merchants and channels to describe the same items, thereby permitting third parties to direct item-level promotional offers to consumers for redemption automatically at retail merchant payment systems and devices that presently have no uniform manner for identifying individual items within their respective payment systems.

Certain embodiments utilize a token-based transaction and marketing system including a transaction server or servers that may communicate directly or indirectly with (i) financial clearing networks, (ii) various merchant POS terminals or sales channels, (iii) third-party servers and/or devices, including without limitation ordering servers and devices executing software for creating and customizing promotional offers or retrieving data from the transaction system; (iv) consumer-facing mobile applications executing on a variety of devices and appliances; and/or (v) a variety of other devices such as payment processing systems, online POSs, and various software applications ("apps"), including web applications (i.e., applications hosted on a server and available to users via a web browser) and mobile applications (i.e., applications deployed in whole or in part on mobile devices such as "smart" phones and tablets). The apps integrated with the token-based transaction system may be capable of receiving identification and financial information (such as a information identifying a payment instrument, payment account, or other payment source) from users (consumers); providing such information securely to the transaction sever of the present system; receiving from the transaction server of the present system an identification code or token for the user; and providing such identification code or token to the user. The identification code or token can be communicated by the consumer user to a merchant payment system in communication with the transaction serer of the present system in order to initiate payment for a retail transaction. For example, the transaction server may function to: (i) receive a transaction request from the merchant POS device, including data such as tokens issued by the transaction server to a consumer device and the merchant POS device and the transaction amount and item information, (ii) approve a transaction request based on the information and to communicate such approval to the merchant POS device; and (iii) submit the transaction for approval via a financial processing network to the consumer's payment instrument issuing financial institution or other source of consumer payment; and (iv) facilitate the movement of funds from consumer to the retail merchant.

Embodiments of a token-based transaction and marketing system of the type suitable for use herewith are further described in, for example, U.S. Pat. No. 8,639,619 ("Secure Payment Method and System"); U.S. Pat. No. 8,694,438 ("Distributed Authenticity Verification for Consumer Payment Transactions"); U.S. Pat. No. 8,838,501 ("Methods and Systems for Permissions Management"); and U.S. Pat. No. 8,924,260 ("Dynamic Ingestion and Processing of Transactional Data at the Point of Sale"), each of which is incorporated by reference herein in its entirety.

Certain embodiments hereof comprise a transaction server or servers in communication with various merchant payment devices and systems, including merchant POS systems for recording and tracking transaction data. The term "transaction data" as used herein refers to data concerning a retail transaction, comprising data identifying and/or concerning the individual items, goods, or services purchased or ordered by a consumer from a merchant ("item data") in connection with a transaction at a retail POS device or through an online (or other remote)) channel. The transaction server may receive transaction data related to each transaction communicated by the merchant payment system in connection with each individual transaction, or the transaction system may retrieve historical transaction data periodically from the payment system, directly or indirectly. The transaction server communicates with various databases, including at least a database configured to store transaction data received by the transaction server in accessible form. Within the transaction database, the transaction data and item data is relationally associated with the consumer, the consumer token issued by the transaction server to the consumer's device, the merchant, and/or the merchant token issued to the merchant device, that participated in the retail transaction.

In certain embodiments, the transaction server(s) in connection with transaction database(s) and merchant POS devices and systems provides for a set of labels, tags, categories, codes, and/or identifiers (collectively, "labels") to be assigned to item data received by the transaction server from the merchant POS device or online POS channel, e.g., as a descriptor or identifier within the transaction system of individual items, good, or services identified in the item data. Labels stored by the transaction system in association with the item data may be assigned automatically to items based on the description applied by the merchant POS system or online channel, or may be assigned manually by a merchant or third-party with access to item and/or transaction data stored within the transaction system database(s), for example, via a web-based graphical user interface. Labels may be assigned to item data on a transaction-by-transaction basis (i.e., automatically by the server at the time of a transaction when item data is received), or may be associated in the transaction system with item descriptions or item codes used by the merchant's POS system or online POS channel to identify an item within the item data, and thereafter applied globally to item data received by the transaction system. Labels associated with product descriptions or codes used in a merchant POS system or online POS channel enable the transaction server to apply the associated label(s) automatically to item data in connection with each transaction as item data is received, and permit the transaction server to determine whether the individual items identified in item data qualifies for any promotion associated with the label applied to such item data. As described further below, labels provide for uniformity in the identification of item data received from various merchants that employ different descriptors for the same or similar items within their respective payment systems, thereby facilitating normalization. Such labels, in connection with the other components and configurations of the invention described herein, which provides a central transaction management system, facilitate the creation, distribution, redemption, and tracking of promotional offers sponsored by third parties and directed toward individual items irrespective of the unique description of the item in any individual merchant's payment system.

For example, a manufacturer or distributor of soft drinks may desire to offer or sponsor a promotion (e.g., $2 off) directed to encourage individual consumers to purchase a particular soft drink at any retail merchant that offers the soft drink and is integrated with a transaction system as described herein. The promotion sponsor may desire to distribute the promotion electronically only to users who had not purchased the particular soft drink in the last ten days, and/or to users who had purchased a competing soft drink within the last ten days, and to have the promotion applied automatically to the purchase price in connection with the consumer's purchase. Alternatively, the manufacturer or distributor may desire to reward loyal purchasers of its products by distributing the same promotion to any consumer after the consumer has purchased five of the sponsor's soft drinks at any retail merchant offering the soft drink and utilizing the transaction system. In another alternative, the manufacturer or distributor may desire to distribute the promotion to users and have the promotion become redeemable automatically after the user has purchased five of the manufacturer's soft drinks. Or the manufacturer or distributor may desire to reward a purchaser of an existing product with a promotion to receive a discount off of a new product if purchased with the existing product.

As explained herein, embodiments of the present invention permit the promotion sponsor to create, customize and distribute such promotions as desired, and to track not only the redemption of the offer but the effectiveness of the promotion on consumer behavior after redemption of the offer. Embodiments of the present invention eliminate the need for the third-party promotion sponsor to have any direct relationship or contact with the retail merchants that sell the third party's product. Embodiments of the present invention further permit the promotion to be distributed by the third party and redeemed by the consumer without the knowledge or participation of the retail merchant at which the promotion was redeemed. The transaction system described herein may permit the retail merchant to be credited (i.e., to be paid) by the transaction system the full amount of the transaction (without deduction of any promotional reward), and for the third-party promotion sponsor to be debited by the transaction system (i.e., to pay) the amount of the redeemed promotional reward.

Certain embodiments of the invention disclosed herein permit promotion sponsors, which may be manufacturers or distributors of retail goods or services, retailer merchants, or other parties, to establish a relationship or account with a transaction system, for example, by secure web communication between a sponsor device and a management server of the transaction system. A sponsor account may include information about the sponsor and information about a financial account for the sponsor, such as a bank account or other payment source, to be used as a means to fund sponsor-offered promotions redeemable at retail POS devices and/or remotely via an order initiated in a mobile app or other online POS channel, and/or to pay fees to the transaction platform provider. As noted above, embodiments of the invention disclosed herein also permit consumers to establish consumer accounts associated with a payment instrument to be used as a means for paying for retail purchases, online or in-store, and to which sponsor promotions can be associated with the consumer, and communicated and displayed to the consumer.

Embodiments described herein provide an interface for a promotion sponsor to design and create a promotional offer by identifying the criteria by which the promotion should be applied to a consumer's purchase. This interface may be, for example, a web-based graphical user interface to or an app in communication with a transaction system as described herein. The transaction data, item data, merchant data (data provided by merchants integrated with the transaction system, such as business name, description, and locations) and user data (any data provided by consumer users of the transaction system) stored in database(s) of the transaction system is arranged so as to relate directly to criteria selectable by the promotion sponsor. The criteria can relate to user demographic information, geographic information, item-identification information, or temporal limitations, among many other possible criteria. Any criteria relating to item data employs transaction system labels to identify individual items with item data, rather than descriptions of items provided by the promotion sponsor or any retail merchant, in order to ensure, as explained below, that redemption of rewards is properly applied regardless of the item description within a given retail merchant's payment system. For example, a promotion sponsor may select that a $2 off promotion should be provided to every person that has purchased a particular soft drink in the last thirty days, using the transaction system label that identifies the soft drink and maps to the various forms of descriptions of the soft drink across various merchant payment systems. The transaction system applies the specified criteria to identify a list of promotion recipient accounts with associated data matching the criteria.

As another example, a retail merchant may desire to sponsor a promotion redeemable only at its retail location(s) by any of its past customers, but good for $2 off a specific new line of products, such as any menu item that contains avocados. Using the transaction system labels and interface described herein, the merchant can apply an "Avocados" label to any individual item description used within its POS system for an item that contains avocados. By using the "Avocados" label to establish criteria for a promotional offer of $2 off, the merchant is able to offer $2 off any item that contains avocados. The invention thereby further permits such a promotion sponsor to create dynamic campaigns such as time-based campaigns, where the "Avocados" promotion is redeemable only after 2:00 pm, or redeemable only until fifteen promotions have been redeemed that day, or only after the merchant has sold fifteen "Avocado" products at full price that day.

Upon approval by the sponsor of the promotion criteria, the transaction system may apply the promotion, and distribute notification of the promotion by various means, to the consumer users of the transaction system meeting the promotion criteria. A record may be created in connection with each recipient user's account within the transaction system database(s) indicating information about the promotion, such as the amount of the promotion available to the user, the criteria for redemption, and the identity of the promotion sponsor. Alternatively, this record may be created by the transaction system only after notice to the consumer and some action by the consumer to acknowledge or claim the offered promotion. Notification of the offered promotion can be distributed by the transaction system electronically to any addressable information contained in the user data of the system, such as through an email to a provided address or SMS message to a provided mobile device telephone number, or to merchant app on a wireless user device that facilitates purchases from the merchant. Notification may be provided through a push notification to the user's mobile device executing the app or through a contactless proximity wireless communication such as Bluetooth, Bluetooth Low Energy (BLE) or near-field communication (NFC) when the user is in range of such a device. A combination of such methods may also be used.

Additionally, in various embodiments, systems and methods in accordance herewith permit a promotion sponsor to communicate directly with the recipient or eligible recipient of a digital promotional offer in a manner that strategically promotes the redemption of the promotion, such as through a message to the mobile device or smartphone of the user (via SMS or a merchant app) when the user is in proximity to a retail location where the promotion can be redeemed. The mobile device of the promotion recipient may be executing the merchant app designed to, inter alia, display a user code or token to be transmitted to the transaction server. The transaction system of the present invention may be configured to trigger messages to the consumer's mobile device when the user device is in communication with a device at a retail location (such as a beacon) transmitting a Bluetooth or BLE signal, or through other means such as geofencing and geolocation using GPS data transmitted by the consumer device to a transaction system server.

As noted above, a promotion record may be created by the transaction system and associated with a consumer user's account in the transaction system immediately upon distribution of the campaign by the promotion sponsor, making the promotion available for redemption immediately by the consumer. Alternatively, the notification described above may require the consumer recipient to take some action to "claim" the promotional offer prior to the promotion being available for redemption. Claiming the promotion may simply require the user to make a selection when running the merchant app, or click on a web Uniform Resource Locator (URL) to send a communication of confirmation of the user's receipt of the reward to the transaction system. In some embodiments, the transaction system may provide a URL requiring the consumer recipient to enter some information or take some action in order to claim the promotional offer. In such cases, the transaction system creates the record in the database(s) necessary to associate the promotion with the recipient's account only after the required action is taken to "claim" the promotion.

Once a promotion is associated with a user account within the transaction system, the promotion is immediately available to be applied automatically by the transaction system to the next retail purchase, online or in-store, made by the user using the transaction system to initiate payment that meets the specified promotion redemption conditions. Given the example of a distributed promotion for $2 off the purchase of a particular soft drink, identified by a specified label within the transaction system, the transaction system analyzes transaction and item data received from a merchant POS device each time a transaction is initiated by the consumer using the transaction system to determine whether the received transaction and item data meets the conditions for any reward or promotion associated with the transacting user's account. A transaction may be initiated by the consumer by providing or communicating to the merchant a consumer identifier, code, or token assigned by the transaction system to the consumer, for example, remotely via a merchant or payment app, or in person via the display of a QR code to be optically scanned by the merchant POS system or communication via NFC or BLE, of the token from a consumer mobile device to a merchant POS device. In this example, if the user purchased the promoted soft drink, the item data received by the transaction system from the merchant POS device would either contain: (i) the label used by the transaction system to identify the promoted soft drink or (ii) a description of the soft drink used within the merchant's POS system, which is mapped automatically by the transaction system based on data provided previously by the merchant to the correct label within the transaction system. Upon detection that the label contained in the received item data corresponded to criteria in a promotional record associated with the user's account in the transaction system, the amount of the promotion (in this case $2) can be deducted automatically from the total transaction amount to be charged to the payment instrument associated with the user's account in the transaction system.

Embodiments described herein enable the integration of consumer devices, merchant devices, and third-party promotion sponsor devices with the transaction system, permit the sharing of certain transaction data with the third-party promotion sponsor so the promotion sponsor can track the redemption of the offered promotion. For example, the transaction system may communicate to the promotion sponsor information stored in the databases) of the transaction system concerning the user data associated with users that claimed and/or redeemed the offered promotion, the identification of items purchased by such users (including items other than the promoted item), the location(s) at which the promotion was redeemed. Embodiments described herein further permit a promotion sponsor to limit, cap, alter, or terminate distribution or redemption of a promotional offer based on predetermined criteria, such as a number of redemptions or a set expiration time period, or upon a later communication from the promotion sponsor to the transaction system with instructions to terminate or alter a promotion.

Embodiments described herein also provide for error resolution by a user in connection with a digital receipt for a transaction initiated with a transaction server. For example, a digital receipt sent to a mobile device of a user following a transaction initiated via the transaction server may include a listing of items purchased (based on information received by the transaction server from the merchant POS device) and an identification of item-level promotions offered by third parties and/or the retailer that were applied to the transaction by the transaction server. To the extent the consumer believes that a promotion should have been applied to an item and was not (for example, because the item was not identified or classified properly in the transaction server system as eligible for a promotion), the digital receipt may permit the user to select or click on an item in the receipt, and to select an available promotion, in order to notify the transaction system provider, merchant, and or promotion sponsor of the customer's complaint or error.

Embodiments described herein automatically facilitate the transfer of value for any promotions redeemed between the promotion sponsor and the redeeming retail merchant following consumer redemption. Using the above example, when a consumer redeems a $2 third-party promotion by purchasing a promoted soft drink at a retail merchant unaffiliated with the soft drink distributor, the transaction platform automatically initiates a charge to the consumer's payment source associated with their transaction system account for the amount of the transaction minus the $2 reward redeemed (i.e., the consumer saved $2). The transaction system pays to the redeeming retail merchant, however, the full amount of the transaction, including the $2 reward.

Transaction systems in accordance herewith may be configured such that each merchant or third-party ordering service need not register or have a preexisting relationship with the transaction-system provider in order to accept online orders initiated by a user through the transaction system. The transaction system may interface to various providers and/or merchants through public application programming interfaces (APIs) in order to obtain menu information and place orders, or may integrate more fully to an ordering provider—see, e.g., U.S. Ser. No. 15/281,835, filed on Sep. 30, 2016, the entire disclosure of which is hereby incorporated by reference. As a result, a consumer using a single app, such as a mobile application configured to communicate with the disclosed transaction system, will have access to a number of merchants that use proprietary online ordering services that may be incompatible with each other. Where multiple ordering channels are available (e.g., multiple third-party channels and/or a proprietary merchant channel), the transaction system may compare the speed and cost of available fulfillment and/or delivery options and initiate the order by communication to the most efficient and/or least costly option.

In addition, the system may accurately predict the user's arrival at a selected merchant location and convey the order (e.g., including the promotional item if selected by the customer) for preparation so that it will be ready for pick-up when the customer arrives, thereby sparing the customer the need to estimate and convey an estimated pickup time. For example, transaction systems in accordance herewith may utilize GPS and/or other geolocation data provided by, for example, a consumer mobile app on a consumer mobile device, and/or Bluetooth or BLE beacon information received from a mobile device, in order to ascertain the consumer's location. Either autonomously or using a third-party mapping system, the transaction system may estimate the consumer's arrival time and arrange for the order to be ready at that time (e.g., by instructions electronically provided to the merchant or to preparation staff). This permits the consumer to make an order-ahead request to have the goods ready at the time the consumer arrives at a location, rather than at a specified time. The transaction system may, in addition, periodically monitor the consumer's location to assess progress and adjust the expected arrival time accordingly. The transaction system, which is configured to facilitate payment, may charge a premium price to the consumer for this "make-it-now" service and/or any of the other benefits and advantages described herein. It may also offer the "make-it-now" option only if it fulfillment is currently possible—i.e., the user is far enough away from the provider that, given the provider's current backlog, the order can be ready when the user is likely to arrive. In some embodiments, the system may use the consumer's desired order and current location to identify merchants capable of fulfilling a "make-it-now" order, given reported merchant backlogs and locations.

Transaction systems in accordance herewith may be configured to integrate to (i.e., communicate and exchange data with) a plurality of independent and/or proprietary online ordering systems, and may further automatically arbitrate among various possible providers for online ordering service in order to determine the least-expensive option for a consumer wishing to place an online order. For example, a consumer desiring a pizza delivery from a selected merchant may have multiple options for online delivery ordering to choose from. The transaction system, through consumer-facing web and/or mobile apps, may be configured to receive order information and determine the most cost effective ordering option to have the order conveyed to the retail food merchant and/or to identify the most cost effective delivery service or mechanism.

Accordingly, in a first aspect, the invention relates to a system for the redemption of promotions in connection with retail transactions. In various embodiments, the system comprises a communications network; a plurality of merchant devices communicating over the communications network, each of the merchant devices being associated with a different merchant; a payment-processing server; a computer memory; and a transaction server. A "merchant device" may be a physical (in-store) or online POS transaction-processing system. First and second merchants are "different merchants" if they are unaffiliated with each other. Thus, suppose there are two "different" merchants each with three POS devices; in this case, the set consisting of one POS device from each of the merchants would qualify as a plurality of merchant devices each associated with a different merchant.

The computer memory may comprise a first database of stored user information, the user information being organized as records each corresponding to a user and containing a user identifier, information relating to at least one payment instrument associated with the user, and user information relevant to promotions including at least user transaction information; a second database of item-promotion information corresponding to at least one promotion relating to an item and redeemable at merchant devices of at least two unaffiliated merchants in connection with purchase of the item; and a third database of item information corresponding to items available for purchase from at least two unaffiliated merchants, the third database being organized as records each corresponding to an item and containing identifiers for the item available from the corresponding merchants.

The transaction-management server communicates over the communications network and with the databases, and may comprise a computer processor for receiving promotion information from a third-party device over the communications network, the promotion information identifying promotions redeemable at merchant devices of at least two unaffiliated merchants; adding the promotion information to the second database; creating associations between the promotion information in the second database and item information in the third database; receiving a request for authorization of a transaction, the request comprising a user token, item information, and a transaction amount; determining whether the item information is associated with any promotion in the second database and, if so, applying the promotion to reduce the transaction amount; and submitting the transaction amount less any applied promotion to the payment-processing sever along with information corresponding to the payment instrument associated with the user in the first database.

In some embodiments, the system further comprises a promotion-management server communicating over the communications network and with the databases, and configured for (i) using the promotion information in the second database to identify promotion-eligible users in the first database, and (ii) communicating the promotion information and a user token to a mobile device of each of the promotion-eligible users. The promotion information may comprise a dollar value, information corresponding to the identity of an item in the third database, and rules for the application of the dollar value to transaction requests containing the item associated with the promotion. For example, the item identity information may be item label records.

In some embodiments, the computer processor within the transaction management server is further configured to (i) use the promotion information to identify promotion-eligible users in the first database, and (ii) create associations between records in the first database corresponding to promotion-eligible users and promotions in the second database. The computer processor within the transaction management server may be further configured to determine, based on the receipt of the user token in connection with a transaction request communicated by a merchant device, whether the user associated therewith is also associated with one or more promotions and, if so, to apply the one or more promotions to the transaction amount. The identifiers may be item label records, in which case the computer processor within the transaction management server may be configured to determine, based on the item label records, whether the user associated with the user token is also associated with one or more promotions that are themselves associated with the item.

In another aspect, the invention pertains to a system for the redemption of promotions in connection with retail transactions where, in various embodiments, the system comprises a communications network; a plurality of user devices communicating over the communications network; a plurality of merchant devices communicating over the communications network; a payment-processing server; a computer memory; and a transaction-management server.

The computer memory may comprise a first database of stored user information, the user information being organized as records each corresponding to a user and containing a user identifier, information specifying at least one payment instrument associated with the user, and user information including at least user transaction information; a second database of item-promotion information corresponding to at least one promotion relating to an item and redeemable at merchant devices of at least two unaffiliated merchants in connection with purchase of the item; and a third database of item information corresponding to items available for purchase at the merchant devices of at least two unaffiliated merchants, the third database being organized as records each corresponding to an item and containing identifiers for the item in the corresponding merchant devices.

The transaction-management server communicates over the communications network and with the databases, and may comprise a computer processor for receiving promotion information from a third-party device over the communications network, the promotion information identifying promotions redeemable at merchants devices; adding the promotion information to the second database; creating associations between the promotion information in the second database and item information in the third database; receiving a request for authorization of a transaction at a merchant from a merchant device or consumer device, the request comprising a user token, item information, and a transaction amount; determining whether the item information received from the merchant or user device is associated with any promotion in the second database and, if so, applying the promotion to reduce the transaction amount; and submitting the transaction amount less any applied promotion to the payment-processing sever along with information corresponding to the payment instrument associated with the user in the first database.

Still another aspect of the invention relates to a system for the redemption of promotions in connection with retail transactions where, in various embodiments, the system comprises a communications network; a plurality of user devices communicating over the communications network; a plurality of merchant devices communicating over the communications network; a computer memory; and a transaction-management server.

The computer memory may comprise a first database of stored user information, the user information being organized as records each corresponding to a user and containing a user identifier; a second database of item-promotion information corresponding to at least one promotion relating to an item and redeemable at merchant devices of at least two unaffiliated merchants in connection with purchase of the item; and a third database of item information corresponding to items available for purchase at the merchant devices of at least two unaffiliated merchants, the third database being organized as records each corresponding to an item and containing identifiers for the item in the corresponding merchant devices.

The transaction-management server communicates over the communications network and with the databases, and may comprise a computer processor for receiving promotion information from a third-party device over the communications network, the promotion information identifying promotions redeemable at merchants devices; adding the promotion information to the second database; creating associations between the promotion information in the second database and item information in the third database; receiving an order from an ordering user device, the order specifying one or more items; and identify, using the third database, and transmit to the ordering user device identifiers of one or more merchants from which the one or more items are available and any promotions associated both with the one or more items and the one or more merchants. In various embodiments, the ordering user device is configured to (a) receive, from the user device, a selection of one of the identified merchants, and (b) transmit the order and any identified promotion to a merchant device of the selected merchant.

The ordering user device may be further configured to compute a transaction amount for the order, apply any identified promotion to reduce the transaction amount, and thereupon transmit the order to a merchant device of the selected merchant. The transmitted order may include a payment instrument. In some embodiments, the transaction-management server is further configured to obtain a geolocation of the user, the identified merchants being ranked in order of proximity to the user. The transaction-management server may be further configured to (i) determine a wait time for preparation of the ordered goods for pickup, (ii) based on the user geolocation and a merchant pickup geolocation associated with the selected merchant, estimate a travel time of the user to a pickup location of the selected merchant, and (iii) transmit the estimated travel time to the ordering user device. The ordering user device may be further configured to determine whether an order preparation time exceeds the estimated user travel time, and if not, to place the order with the selected merchant as a pickup order.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DESCRIPTION

Figure 1:
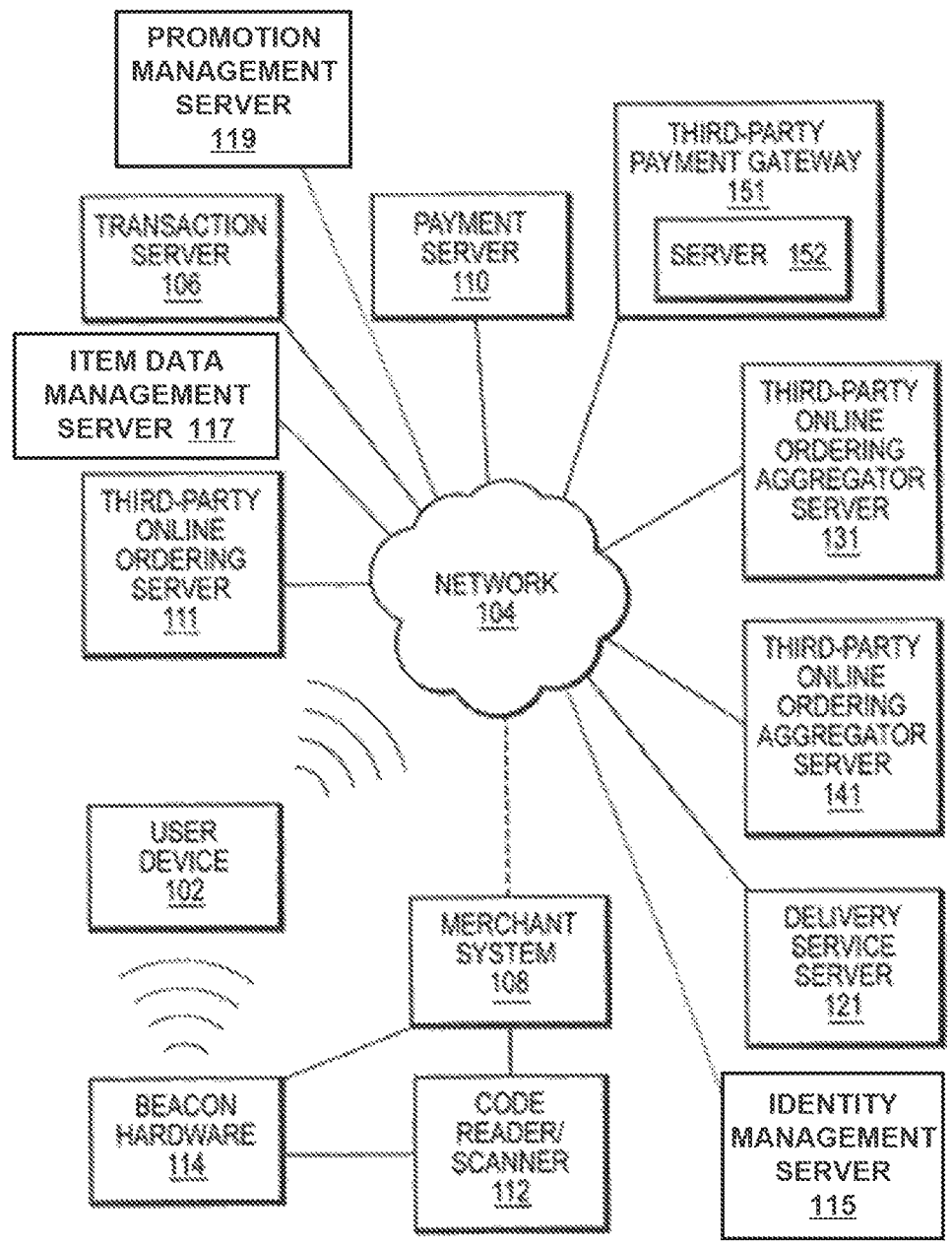
FIG. 1 is a block diagram of an exemplary transaction system and network in accordance with an embodiment of the invention.

Refer first to FIG. 1, which illustrates an exemplary mobile-payment and online ordering transaction system and network that includes user equipment (e.g., a consumer computing device or mobile device) 102 linked to a network 104 (e.g., a cellular telephone network, the Internet, or any wide-area network or combination of networks capable of supporting point-to-point data transfer and communication) of various interconnected devices to support wired, wireless, or any two-way communication. Throughout this disclosure, the term device 102 may be referred to as "mobile device 102" for exemplary purposes, but such references are not meant to preclude the use of any consumer computing device as the device 102. The network 104 connects various devices, including a transaction server 106, one or more merchant systems (e.g., POS terminals or online POS portals) 108 and related components, a payment server 110, one or more third-party online ordering servers 111, an item data-management server 117, a promotion-management server 119, one or more delivery providers 121, one or more third-party online ordering aggregator services 131, 141, and a third-party payment gateway 151 and server 152 associated therewith utilizing, again, wired, wireless, or any two-way communications. For clarity, a distinction is drawn in the figure between the third-party payment processor 151, which may be an account-issuing institution or a payment-processing institution, for example, and the server 152 controlled by this party in processing transactions as herein described. In the ensuing discussion, however, the payment gateway 151 and the server 152 are referred to somewhat interchangeably as the context warrants.

Each merchant system 103 may be associated with a merchant who offers goods or services for sale to the user possessing the device 102. In one embodiment, the merchant system 108 is a POS system (e.g., an electronic cash register) that includes or connects to a code reader or scanner (hereafter "reader") 112 among other components. The merchant system 108 may also include beacon hardware 114, as part of the scanner 112 or as another connected or unconnected device, that transmits a Bluetooth or BLE signal containing an identifier known to the transaction server 106 and associated within the transaction system with the location of merchant system 108. The reader 112, may be capable of reading and/or decoding, for example, a barcode, a radiofrequency identification (RFID) code, or a bar code or "Quick Response" (QR) code, and/or receiving signals, such as NFC signals, Bluetooth signals, BLE signals, iBeacon signals, audio signals, or infrared signals. In addition, the reader 112 may be mobile, or physically associated with the merchant system 108.

The payment server 110 may be operated by a payment-processing entity responsible for authenticating, processing, and/or actually performing the payment transaction. For example, a so-called "direct" payment processor represents the financial-processing backend provider to credit-card issuers and payment services such as PAYPAL. An "indirect" payment processor is an independent entity processing transactions for multiple payment services and maintains its own records and data.

The third-party server 111 may be in communication with the merchant system 108 and/or authorized by the merchant 108 to accept orders on the merchant's behalf. The third-party online ordering aggregator services 131, 141 may each have business relationships with the merchant 108 and are authorized to accept online orders on behalf of the merchant. In one implementation, the merchant 108 and/or online ordering providers 111, 131, 141 do not offer a delivery service and the transaction server 106 may communicate with a server of the delivery provider 121 to arrange delivery of the items ordered from the merchant 108 to a specified delivery address at a specified time designated by the user.

Figure 2A:
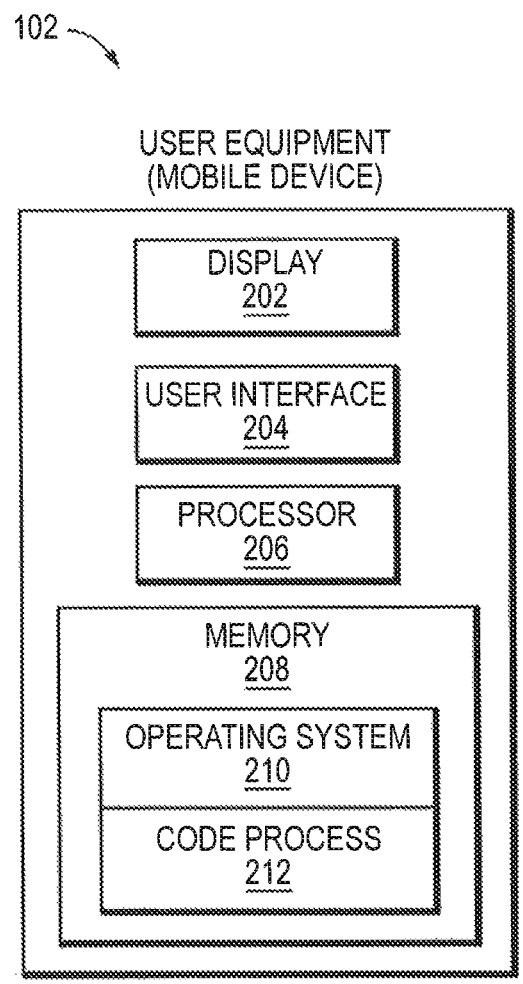
FIGS. 2A and 2B are block diagrams of an exemplary mobile device and transaction server, respectively, in accordance with an embodiment of the invention.

The third-party payment gateway 151 and associated server 152 process transactions made by the usersing the payment instrument registered with transaction server 106 at physical and online points of sale. The transaction server 106 may be configured to communicate via secure application programming interfaces to the server 152 of third-party payment gateway 151, such as a bank server, information concerning the payment instrument registered by the user with the transaction server 106, and to receive in response information concerning the locations (either by address or by latitude/longitude data obtained via a POS system 108), merchants, amounts, and/or items associated with transactions by the usersing that payment instrument Referring to FIG. 2A, in various embodiments, the mobile device 102 includes a conventional display 202, a user interface 204, a processor 206, and a memory 208, and one or more transmitter/receivers 209 capable of transmitting and/or receiving signals such as cellular signals, wireless signals, radiofrequency signals, NFC signals, Bluetooth signals, iBeacon signals, audio signals, or infrared signals. The memory 208 includes an operating system (OS) 210, such as GOOGLE ANDROID, NOKIA SYMBIAN, BLACKBERRY RIM or MICROSOFT WINDOWS MOBILE, and a code process 212 that implements the device-side functions as further described below. The mobile device 102 alone may not require a network to be used in the context of the present invention. In addition, additional transactional information may be embedded in the code process 212 for transmission through the network 104 for later processing on a back-end server (e.g., the payment server 110). As used herein, the term "mobile device" used for transacting a mobile payment refers to a "smart phone" or tablet with advanced computing ability that, generally, facilitates bi-directional communication and data transfer using a mobile telecommunication network, and is capable of executing locally stored applications and/or payment transactions. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, and personal digital assistants (PDAs).

Figure 2B:
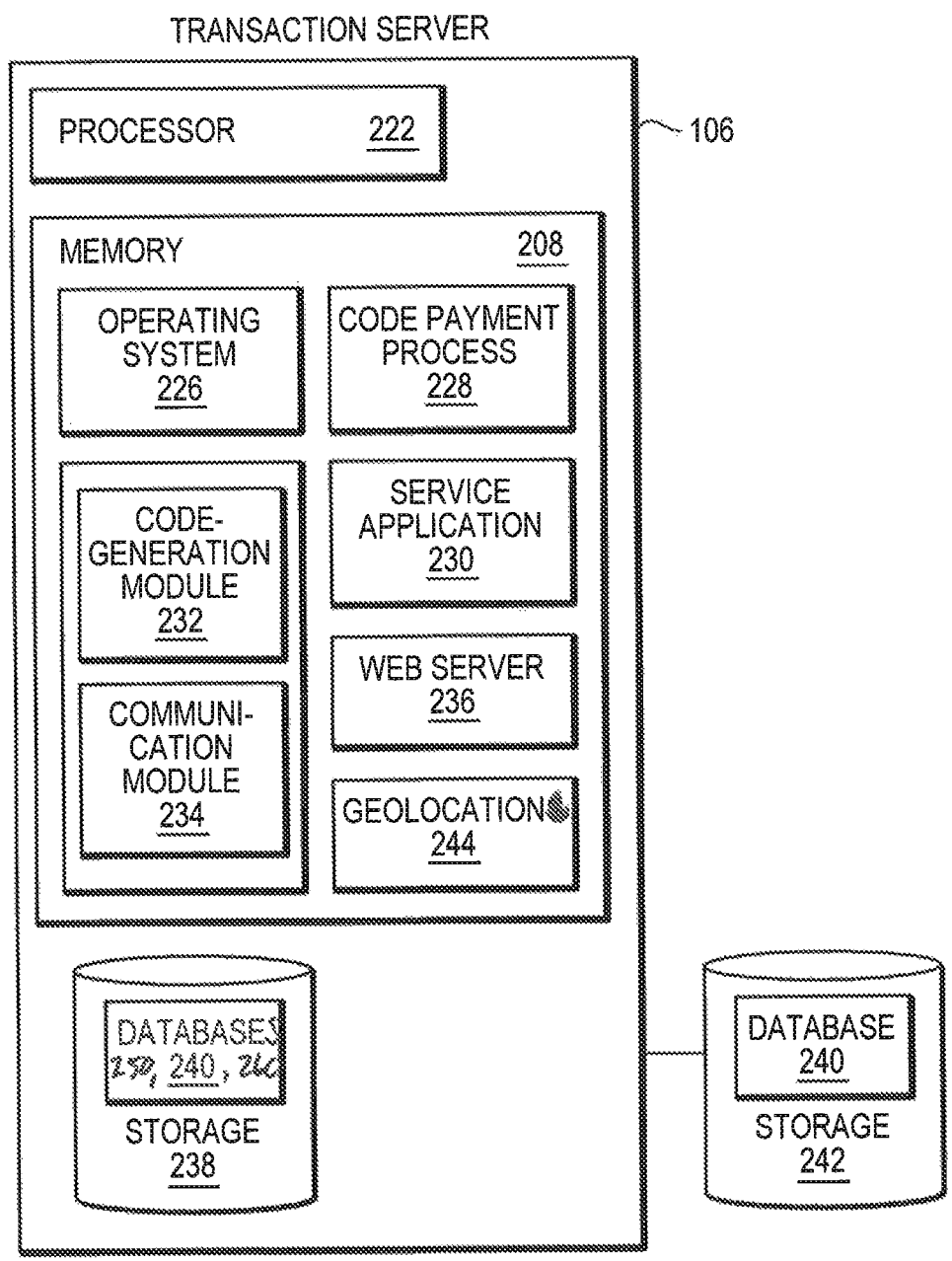

Referring to FIG. 2B, in some embodiments, the transaction server 106 includes a processor 222, a memory 224 having an operating system 226, a code payment process 228, a service application 230, a web-server block 236, and a storage device 238. The code payment process 228 implements the server-side functions of facilitating secure mobile payments as further described below and in, for example, U.S. Pat. Nos. 8,639,619, 8,694,438, and 8,838,501, which are incorporated by reference herein in their entireties. The service application 230, integrating a code-generation module 232 with a communication module 234, generates a unique user identifier and communication with a consumer device 102, such as a mobile device. More specifically, the code-generation module 232 may generate a unique code tied to the information received from the user via the communication module 234; the generated code may then be transmitted back to the consumer device or mobile device 102 via the communication module 234. The code-generation module 232 functions similarly to a conventional code-generator that converts the input information into a form that can be readily read or executed by a machine. The communication module 234 may be a conventional component (e.g., a network interface OF transceivers designed to provide communications with a network, such as the Internet and/or any other land-based or wireless telecommunications network or system, and, through the network, with a consumer's device 102. To enable the handling of requests from the mobile device 102, the memory 224 contains a web-server block 236, which can be a conventional web server application executed by the processor 222.

The transaction server 106 may include a database 240 that resides in the storage device 238 and/or an external mass-storage device 242 accessible to the transaction server 106. The database 240 includes user, merchant, third-party online ordering service, third-party online ordering aggregator service, and delivery service partitions (or separate databases). The user database stores, for example, a record of each registered user and payment information for the user, e.g., a code, signal and/or a token associated with each user record. The readable code may be a mature code (e.g., displayable as a QR code or a bar code), a seed code that can generate a mature code later, or an authentication token. In one embodiment, the readable code is unchangeable. In another embodiment, the readable code is reset periodically (e.g., in a predetermined period of time), or upon request or manual intervention, for security purposes or upon receiving a request from the user. The merchant partition (or database) may include records each specifying a merchant, goods sold by the merchant, a geolocation of and, as described below, a current wait time for order preparation received from the POS system of the specified merchant (or from a web server via a script, or from an ordering server via an API call that allows the transaction server 106 to receive wait-time data). Likewise, the partitions (or databases) of the third-party online ordering service, third-party online ordering aggregator service, and delivery service may include records specifying third-parties authorized by the merchant to accept orders on the merchant's behalf, third-party online ordering aggregator services having business relationships with various merchants and authorized to accept online orders on behalf of the merchant, and delivery providers, respectively.

The server 106 also includes a geolocation application 244. As used herein, the term "geolocation" refers generally to an approximate terrestrial location, whether expressed in terms of GPS coordinates, a cellular location, an address, etc. As explained in greater detail below, geolocation application 244 computes expected travel times between a user geolocation and a merchant's order pickup site. Geolocation application 244 may communicate with third-party mapping and/or traffic-monitoring services in computing travel times.

Referring to FIG. 2B, in some embodiments, the transaction server 106, a processor 222, a memory 224 having an operating system 226, a code payment process 228, a service application 230, and a web-serer block 236 and a storage device 238. The code payment process 228 implements the server-side functions of facilitating secure mobile payments as further described below. The service application 230, integrating a code-generation module 232 with a communication module 234, generates a unique user identifier and communication with the mobile device 102. More specifically, the code-generation module 232 may generate a unique code tied to the information received from the user via the communication module 234; the generated code may then be transmitted back to the mobile device 102 via the communication module 234. The code-generation module 232 functions similarly to a conventional code-generator that converts the input information into a form that can be readily read or executed by a machine. The communication module 234 may be a conventional component (e.g., a network interface or transceiver) designed to provide communications with a network, such as the Internet and/or any other land-based or wireless telecommunications network or system, and, through the network, with the mobile device 102. To enable the handling of requests from the mobile device 102, the memory 224 contains a web-server block 236, which can be a conventional web server application executed by the processor 222.

The transaction server 106 may implement the functions of payment and identity-management servers 115 and may include a user database 240 that resides in the storage device 238 and/or an external mass-storage device 242; the user database 240 stores, for example, a record of each registered user and a readable code or signal associated with each user record. The readable code may be a mature code (e.g., a QR code or a bar code), a seed code that can generate a mature code later, or an authentication token. In one embodiment, the readable code is unchangeable. In another embodiment, the readable code is reset periodically (e.g., in a predetermined period of time) for security purposes or upon receiving a request from the user. The user database 240 (or another similar database) also stores a record for each user containing user demographic information, and such user records can be relationally associated with other information concerning the user in the user database 240 or other server databases, including for example, records containing transaction data, item data, and promotional data. For example, the user database may include records for each transaction initiated by a user via the transaction server 106 at a merchant system 108, including for example, the date, time, location, and amount of each transaction. The user database may include records identifying each item purchased on connection with each transaction initiated by a user via the transaction server 106 at a merchant system 108. These records are associated with the user record for a registered user and directly or indirectly with the identifying and demographic information for the user and/or the readable code or signal associated with each user record.

The transaction server 106 may implement the functionality of item data-management server 117 and may include an item-data database 250 that resides in the storage device 238 and/or an external mass-storage device 242 accessible to the item data-management server 117, the payment and identity-management server 115; and may also implement the functionality of the promotion-management server 119. The item data-management server 117 may function to apply labels to records associated with item data stored in connection or association with user records, either based on rules, logic, or algorithms created previously within the server and/or manual instructions to the server to apply such labels, for example, through a web-based GUI presented by the item data-management server 117 or promotion-management server 119. The item data-management server 117 may also function to apply labels to item data received from merchant systems 108 in bulk, and thereby create rules for the automated application of labels to item data contained in transaction data received in future transactions. The item data-management server 117 may also function to apply labels based on predictive or machine-learning algorithms applied to item data received from merchant POS systems 108 (for example, the item data-management server 117 may be configured to determine automatically that the description of an item within a merchant system containing some form of the word "Coca-Cola" should be labeled as "COKE"). The item-data database 250 may store, for example, records of individual items purchased by users in POS transactions via the transaction server 106. The item-data database 250 may also store, for example, records identifying all items sold by a given merchant, along with the descriptions or identifiers or codes used within such merchant system 108 to refer to or identify each item. The item-data database 250 may also store information concerning labels available within the transaction server 106 to identify individual items and associations between transaction system labels and individual items.

The transaction server 106 may include a promotion-management server 119 and may include a promotions database 260 that resides in the storage device 238 and/or an external mass-storage device 242 accessible to the promotion-management server 119. The promotion-management server 119 may function to present a web-based GUI for the creation of promotional offers and campaigns, including for example, redemption rules and distribution criteria, to distribute promotional offers to user devices associated with users according to said criteria, and to apply redemption rules to transaction and item data received from merchant POS systems 108 in connection with requested transactions. The promotion database 260 stores, for example, a record of each promotion designed and created by a promotion sponsor, including for example, information concerning the criteria for identifying recipients of the offer, criteria for the redemption of the offer by eligible recipients, the nature or amount of the promotional offer, and promotion sponsor information. These records may be relationally associated with user records contained in the user database 240. The transaction server 106, the payment and identity-management server 115, item data-management server 117, and promotion-management server 119 may be individual server devices or combinations of devices or may be implemented as a single server device, as noted above, or in a combination of devices.

User Accounts. The transaction server 106 described herein, in one embodiment, permits users to establish accounts with the transaction system by providing information including at least: (i) some addressable information of the user, such as an email address, IP address, device identifier, phone number, or the like; and (ii) some financial account information, such as a debit or credit card account number, a prepaid credit card account number, a bank account number, or the like. Upon establishing an account, the transaction system assigns a user an identification token, which may be encoded or represented in the form of a bar code, QR code or other pattern that can be read or scanned by an optical scanner, either from the display of a computing or mobile device or a printed paper or card, which may be an alphanumeric code, or which may be encoded or represented as data that can be communicated to POS terminal system by a computing or mobile device using a proximity wireless communication technology, such as NFC, Bluetooth, or iBeacon technology, or an alphanumeric that may be communicated to a POS terminal or entered into an online POS, or a combination of these methods. The identification token is associated in the transaction server 106 with the user's information, including the at least some addressable identification information and financial account information, and stored in the user database 240. The user may initiate a purchase transaction at a merchant system 108 (such as a POS terminal or online POS) by presenting, displaying, or communicating the user identification token to the merchant, for example, via a reader or scanner 112 in connection with a merchant POS terminal 108. The merchant seeks authorization of the purchase transaction by communicating, over established, existing networks 104, information to the transaction server 106 including at least the transaction amount and user identification token. The merchant also may submit information including a merchant identification token assigned by the transaction server 106. The transaction server 106 may in turn submit a charge to a financial account associated with the user identification token using known methods for processing electronic transactions, including through a payment processor 110. The transaction server 106 makes or facilitates payment to the merchant.

User Payment Transactions. In various embodiments, payment transactions in accordance herewith may include or consist of three phases: an activation phase, a registration phase, and a use phase. In the activation phase, the user first provides identifying information to the transaction system/management server 106 using, for example, a mobile device 102. The code-generation module 232 of the transaction server 106 then generates a unique user identifier tied to an account created for the user; the user's account, in turn, may be represented by a record in a user database 260 maintained by the transaction server 106. The user record includes, for example, the transmitted user information and/or generated user identifier, as well as other information (name, address, wireless phone number, etc.) uniquely identifying the user; the user record may be part of, or include a pointer to, the user's financial account information. In some embodiments, the unique user identifier is a seed code utilized to generate a unique mature code (e.g., a QR code or other codes) that can be captured by, for example, a merchant's POS terminal 108. In one embodiment, the generated unique mature code is stored in the database 260 and successively transmitted to the user's mobile device 102 via, for example, wireless cell phone communication, ultrasound, Bluetooth, near-field communication, Internet, or a mobile application. In another embodiment, the unique mature code is directly sent to the mobile device 102 without being stored in the database 260. This unique mature code may be later presented to the merchant system 108 when the user purchases goods or services, as further described below. Because the mature QR code maps to the user's identity information stored in the database 260 only and contains no information about any user's payment tokens (e.g., credit or debit card information) or payment instrument data, hacking the management server 106 alone cannot provide sufficient information to conduct a fraudulent payment. Additionally, the unique identifier may be used as a seed to generate a multitude of QR codes all of which can be decoded back to a single unique QR code, allowing for new QR codes to be generated and pushed to the mobile device 102 on a periodic, per-transaction or time-out basis; the same key, generated with respect to the unique QR code, can be used to validate any of these additional QR codes. In addition, the QR code may be reset upon receiving a request from the user, for example, at the beginning of each transaction; this further prevents a fraudulent use of the QR code. Although the discussion herein focuses on QR codes for purposes of illustration, the present invention is not limited to any particular form of code. In addition, any suitable mechanism for representing and transferring the code derived from a seed code may be used. For example, ultrasound, Bluetooth, NFC or other communication media besides visual representation and automated recognition may be used and are within the scope of the current invention.

In the registration phase, the user registers a payment instrument (e.g., a credit card, debit card, a bank account, or a pre-loaded payment card) to her user account. In a representative transaction flow, the user first issues a registration request to the transaction server 106 using the mobile device 102 or a web application. The transaction server 106 responds to the request with a registration form (e.g., in the form of a web page), which is displayed on the device 102 in a manner that permits the user to enter information identifying the payment instrument to be registered. In one embodiment, the registration form includes a client-side script that directly submits the data entered by the user to a third-party payment processor's gateway over, for example, a secure socket layer (SSL) connection. The user-entered data is stored in or by the third-party payment gateway 151, which also generates a "redirect" uniform resource locator (URL) that includes the Internet address of the transaction server 106 and a token that identifies the payment instrument, but which does not identify the user. When the user submits the entered registration data, the client-side script causes a request for the redirect URL also to be transmitted to the gateway 151. When the redirect URL arrives at the mobile device 102 and is processed by the user's browser, it redirects the browser back to the management server 106 without displaying any content, thus creating the impression that the user has never left the management server site. In another representative transaction flow, the user transmits information about the payment instrument to the management server 106 using the mobile device 102. The management server 106 encrypts the received information with a one-way key and passes the encrypted data to the third-party payment gateway 151. The third-party gateway 151, which is the only party having the key to decrypt the data in the transaction, generates a token that identifies the registered payment instrument. The generated token is transmitted back to the management server 106 and stored therein for transacting future payments. Because the data including a user's identity and payment instrument are separately stored in the management server 106 and the third-party payment gateway 151, respectively, unauthorized access to any one of the records therein is insufficient to initiate a payment transaction under the user's name; this, again, ensures the security of the mobile payment.

In various embodiments, the token generated by the third-party payment gateway 151 is transmitted to the transaction server 106. The transaction server 106 associates the token with the user's account record and stores it in the database 260 as a payment identifier. Upon receiving a payment request from the user, the transaction server 106 uses the stored token to initiate the payment transaction through the third-party payment gateway 320, against the payment instrument previously submitted, without ever having knowledge or possession of the payment-instrument data itself. Since the payment-instrument data is not stored and cannot be obtained by the management server 106, this approach, again, prevents fraudulent payments.

In the use phase, the management server 106 executes the instructions of the code payment process 222 and transmits a QR code to the user's mobile device 102 for presentation to a merchant; as noted above, the QR code may be revised periodically for security purposes, and is typically generated using encryption based on user-specific information in the database 260.

A payment transaction is initiated when the user presents the QR code stored in the mobile device 102 to the merchant system 108. The merchant system 108 may scan the code using, e.g., a POS integrated scanner, and thereupon transmits the scanned data along with the payment amount to the management server 106. The merchant system 108 may also communicate to the management server 106, along with the scanned data or in a separate communication, information concerning item data for the transaction, which may include for example, an identification of individual items purchased by the user in that transaction. The identification of items within the item data may include textual descriptions used within the merchant system 108 to identify items, codes used to identify items, and/or labels used by the management server 106 to identify items. At the time of the payment transaction, neither the merchant 108 nor the user has access to the underlying payment instrument; the QR code merely identifies the user. Further, in the case of a QR code that resets, even an image of the presented QR code may not be used again for future payments (as the user would by then have a new QR code).

In various embodiments, upon receiving the QR code and payment amount and/or item data from the merchant system 108, the management server 106 decodes the QR code and matches the information therein to the user's record stored in the database 260. The management server 106 then retrieves the stored payment token associated with the user's account and passes the token and the amount to be charged to the third-party gateway 151 for authorizing a payment. The third-party payment gateway 151 authorizes and processes (or rejects) the payment request against the payment instrument corresponding to the token, and creates an associated transaction identifier or rejection code. The created identifier or code may be sent to the management server 106 for re-transmission to the merchant system 108, or may instead be sent directly to the merchant system 108 to complete the transaction. Where the created identifier is first handled by the management server 106 before transmittal to the merchant system 108, the management server 106 may generate and provide additional information (e.g., tracking information) to the merchant system 108 to enable a closed-loop environment of consumer information—e.g., effectiveness of advertisement, consumer demographics, and referral information. Again, because none of the user's mobile device 102, the merchant system 108, the management server 106, or the third-party gateway 151 possesses both user identity information and the underlying payment instrument, this triple-blind payment system provides high security for the user's identity and privacy; accordingly, the possibility of financial losses for the customer is minimized during an m-payment transaction in accordance herewith.

Mapping Item Data. In various embodiments, upon receiving the QR code and payment amount and item data from the merchant system 108, the transaction system or management server 106 may store item data for the transaction in association with user record, either in a user database 240, or in a separate item-data database 250. An exemplary item record includes information concerning item data received by the transaction system from a merchant POS device integrated with the transaction system. The transaction server 106, for example, using the item data-management server 117, identifies within the item-data database 250 any associations created between the description of identifiers of individual items received in the item data from the merchant system 108 as part of the transaction and applies and stores with such item data the appropriate label established within the transaction server 106. For example, upon receiving a transaction request for the purchase of a bag of potato chips and a soft drink, the item data-management server 117 may store the item data within a record within item-data database 250, associate the data with a user record contained within user database 240, and may further associate with each item within the item data one or more labels used in the transaction server 106 based on associations created for each item description, as explained below. Alternatively, the item data-management server 117 may apply matching, machine-learning or other conventional algorithms, or a rule, to identify an appropriate label or labels based on the nature of the description contained in the item data received from merchant system 108. For example, a description of a bag of potato chips used within merchant system 108 (such as, "Chips, BBQ Large") may have been previously associated with transaction system labels for "CHIPS," "BARBEQUE CHIPS," "GLUTEN-FREE," "SNACKS," or with a specific brand identifier such as "LAYS." The item data-management server 117 applies rules for the association of labels established within the transaction server 106 by a merchant or third-party user of the system, or an administrator of the system, in the manner described below. The item data-management server 117 may also apply conventional algorithms and logic for selecting a label or labels to associate with item data based on similarities between an available label and the description of the item received from the merchant system 108. For example, the item data-management server 117 may apply algorithms to determine that a description containing the word "Chips" should be labeled with at least "CHIPS."

The present invention, in various embodiments, provides a number of ways to establish associations between labels in the transaction server 106 and item data descriptions used within a given merchant system 108 in order to enable the transaction system to apply labels upon the receipt of transaction data and item data. As discussed above, item data may be provided to the transaction server 106 by the merchant system 108 with each transaction and stored by the transaction server 106, for example, in item-data database 250. Such data can be associated not only with the user identification or code for the transaction, but also with the merchant identifier or code submitted with the transaction request, such that all of the item data associated with an individual merchant, whenever and however received from the merchant system 108, can be recalled from item-data database 250 based on a given merchant identifier.

In another embodiment, rather than receiving item data from the merchant payment system in each transaction, the transaction server 106 may receive and store all item data stored within a merchant system 108 in a single communication. For example, a merchant may "seed" the item data within the transaction system by entering a "test" transaction within the merchant system 108 containing every unique individual item identifier, descriptor, or code from the merchant's inventory or menu, along with a merchant identifier assigned by the transaction server 106. (The merchant can then refund the test transaction so that no actual charge or payment is created within the transaction server 106.)

In another embodiment, rather than receiving and labeling item data from the merchant payment system in each transaction, the transaction server 106 may receive and store all item data stored within a merchant system 108 in a single communication. For example, a merchant may "seed" the item data within the transaction system by entering a "test" transaction within the merchant system 108 containing every unique individual item identifier, descriptor, or code from the merchant's inventory or menu. The transaction server 106 can then display the list of items and identifiers or descriptors to the merchant via a GUI web interface, for example, via the promotion-management server 119. (The merchant can then refund the test transaction so that no actual charge or payment is created within the transaction server 106.) Using the web-based GUI, the merchant can tag or label an item (or several items) as, for example, "FISH TACOS" to be eligible for a future "$2 off Fish Tacos" promotion distributed to its customers, and/or to tag or label items "CHIPS" or with a specific third-party brand such as "LAYS" in order to enable third parties to target future consumer promotional rewards at such items.

After receiving item data from merchant system 108, however, and whenever it is received, the transaction server 106 can display the list of items and identifiers or descriptors to the merchant via a GUI web interface—for example, via the promotion-management server 119. The promotion-management server 119 is configured to access item data received from merchant payment system 108 and stored within the transaction server 106 and to present a list of unique item descriptions via a web-based GUI to a merchant or other party with appropriate permissions to access data via transaction server 106. Using the web-based GUI, the merchant or other party would then be able to tag or label an item (or several items) as "FISH TACOS" to be eligible for a future "$2 off Fish Tacos" promotion distributed to its customers, and/or to tag or label items "CHIPS" or with a specific third-party brand such as "LAYS" in order to enable third parties to target future consumer promotional rewards at such items. As another example, a merchant may label all salad items displayed in the GUI by the promotion management server 119 as "SALAD" and all of the soup items displayed in the GUI by the promotion management server 119 as "SOUP."

Establishment of Promotional Offers and Campaigns. In various embodiments, the transaction server 106—for example, via the promotion-management server 119—in addition to providing a web-based GUI or other interface for merchants to label data, can provide a ewe-based GUI or other interface for patties to design promotional campaigns comprising a promotional offer redeemable at a point of sale (i.e., $2 off of soup), criteria for selecting recipients of the redeemable promotional offer (i.e., users that have never purchased soup at merchant's locations), and/or criteria for redemption of the promotional offer (i.e., good only on Friday). The promotion-management server 119 may create a promotional offer record to be stored in a promotions database 260 identifying information about the created promotion, such as the amount of the promotion, the identity of the party funding the promotion (in this example the retail merchant), information concerning the locations and times at which the promotion may be redeemed, and identifying the items for which the promotion will apply, using labels previously established in the transaction system by the merchant or another party and associated with one or more inventory or menu items as identified within the merchant system 108 (in this example, "SOUP").

The promotion-management server 119 may have access to user information within the transaction system, for example, user records stored within a user database 240 and to the transaction data and item data associated with each user. Upon the entry of criteria for selecting recipients of a promotional offer by a merchant or other party, the promotion-management server 119 may produce a list of user recipients with criteria matching the entered criteria, for example, users who have purchased any items labeled "SOUP" within the last 30 days at any of the locations of a particular merchant. Alternatively, a third-party might seek a list of eligible recipients who have not purchased items labeled "COKE" within the last 30 days at any merchant location. Users identified as eligible recipients may be identified anonymously, by category, or using user information such as name, email address, phone number, or mobile device ID. A promotion sponsor may select all or some of eligible recipients to receive an offer.

In some embodiments, the promotion sponsor may establish the promotion with additional criteria to the redemption of the promotion by the promotion recipient. For example, the promotion may be designated such that it may only be redeemed by a recipient after the recipient has purchased five of an identified requisite item (such as an item labeled "COKE"), or when the recipient has, in the same transaction, purchased another specified item. The promotion sponsor may also include limitations on redemption of a promotion tied to activity other than activity of the receiving consumer. For example, the promotion sponsor may restrict a promotion to a set number of redemptions each day, to a certain time period of a day, or to become redeemable only after some other condition has been achieved, such as the 100th transaction of a day.

Distribution of Promotions, Campaigns and/or Offers. Upon the establishment of a promotional offer by a promotion sponsor via the transaction server 106 and/or promotion-management server 119, a notice may be sent to a recipient user based on information stored in association with a user record for the user, such as an email address, phone number, or mobile device identifier. In various embodiments, the notification is directed to a software application executing on a mobile consumer device 102, which software application can be used to display or transmit a consumer identifier, in the form of a QR code or NFC or BLE communication, to a merchant point of sale system 108 at a retail location. The notification can inform the user that a promotional offer will be applied to her next purchase meeting the specified redemption criteria, or can require an action by the user in order to activate the promotion offer within the transaction server 106, such as clicking a link to a URL that directs the transaction server 106, and/or the promotion-management server 119, to activate the promotional offer for that user. The promotion-management server 119 can also store data in association with a promotional record concerning the identity of users who "claimed" the promotion and the timing of such claims.

Figure 3:
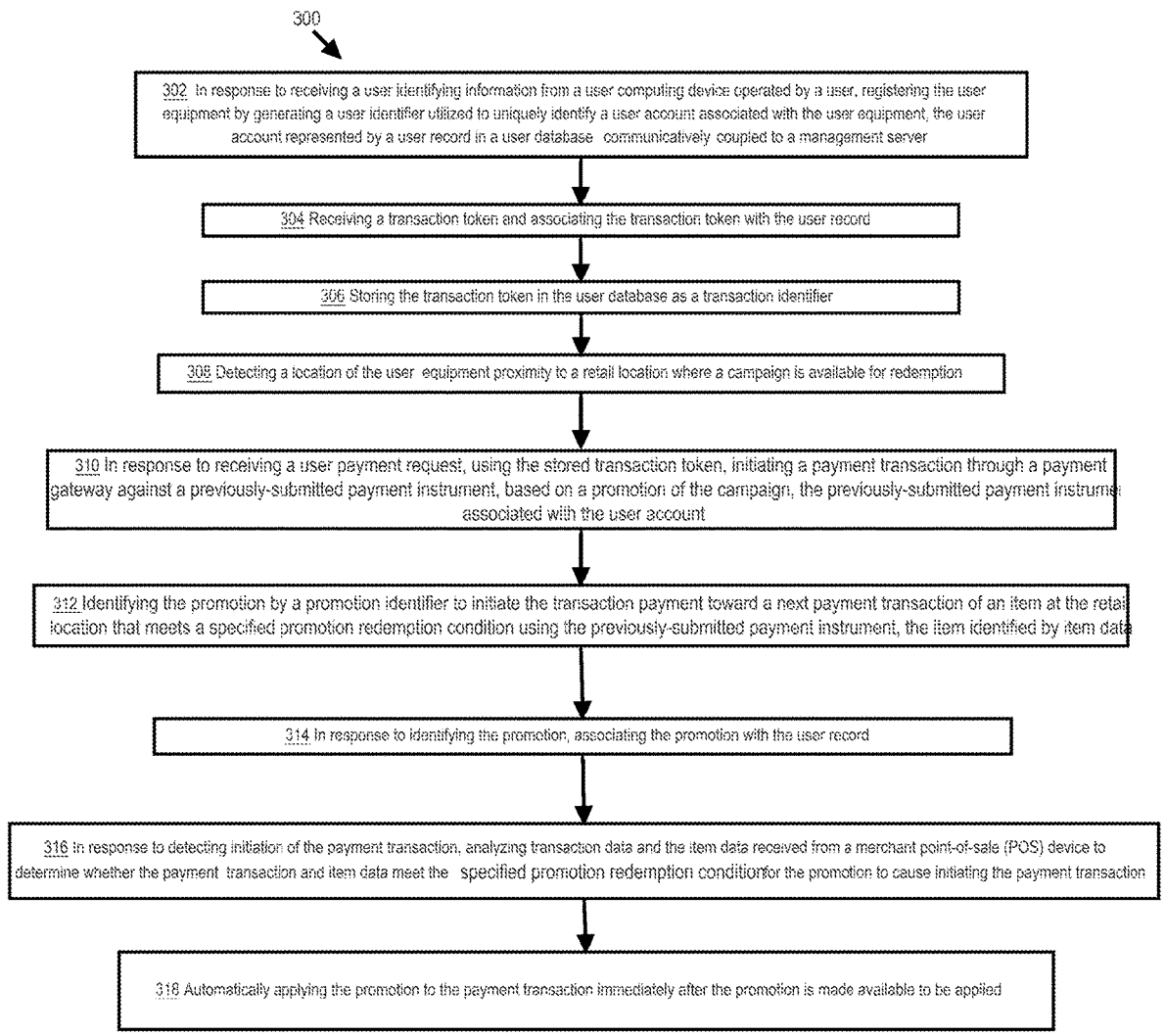
FIG. 3 is a flow diagram of an example promotion-based transaction process employing an embodiment of the disclosure.

FIG. 3 is a flow diagram of an example promotion-based transaction process employing an embodiment of the disclosure. The steps of FIG. 3 are performed in accordance with the disclosed embodiments and methods, as discussed herein. The example process 300 begins at step 302 in which, in response to receiving a user identifying information from user equipment 102, server code-generation module 232 of transaction server 106 registers the user equipment 102 by generating a user identifier utilized to uniquely identify the user account.

At step 304, transaction server 106 receives a payment token from payment gateway 151 (or 320) and associates the payment token with the user record. At step 306, transaction server 106 stores the payment token generated at step 302 in user database 240 as a transaction identifier. At step 308, transaction server 106 detects the location of user equipment 102 in proximity to a retail location where a campaign is available for redemption and at step 310. In response to receiving a user payment request and based on the payment token, transaction server 106 initiates a payment transaction at user equipment 102 through payment gateway 151 (or 320) against a previously submitted payment instrument associated with the user account. The previously submitted payment instrument is based on a campaign promotion and associated with the user account.

At step 312, transaction server 106 identifies the campaign promotion by a promotion identifier to initiate payment toward a next purchase transaction of an item, in this case the payment transaction, at a retail location that meets a specified promotion redemption condition using previously-submitted payment instrument, the item identified by item data.

At step 314, in response to identifying the campaign promotion, transaction server 106 associates the campaign promotion with the user record. At step 316, in response to detecting the user equipment initiating the payment transaction, transaction server 106 analyzes the transaction data and the item data received from a POS device and located at the retail location, to determine whether the payment transaction and the item data meet the specified promotion redemption condition to cause initiating the payment transaction. At 320, transaction server 106 automatically applies the promotion to the next retail payment transaction, immediately after the promotion is made available to be applied.

Application/Redemption of Rewards/Promotions. Upon creation of a promotion record or records by a promotion-management server 119, which may include information concerning the identified eligible recipients, the promotion records may be relationally associated with user records contained in the user database 240 for the eligible recipients by updating the user records to reflect the availability of the promotional offer. This association can be created by a promotion-management server 119 upon creation of the promotional offer record or upon "claiming" of the promotion offer by a recipient user in response to a notification.

Following the association by the transaction server 106 of a promotional offer with a receiving user's transaction-system account (i.e., a user identification token), the receiving user can present a user identification token provided to the user by the transaction server 106 at a merchant's POS or online payment system 108 to initiate payment for a purchase transaction. Upon presentation of the user identification token, such as by scanning a QR code on the display of a mobile device 102 at an optical scanner 112 in connection with merchant system 108, the merchant communicates the user identification token, transaction amount, and any other information to the transaction server 106, as in a standard transaction system transaction, over existing, established networks such as network 104. In response to receiving a transaction request, the transaction server 106 queries the user record associated with the user token received in the transaction data to determine whether any available promotions are associated with the user record and, if so, whether the received transaction data and item data meet the criteria established in the promotion record for the application of the specified reward. As part of this process, the transaction server 106—for example, via item data-management server 117—may cause item data received in the transaction request to be stored and/or associated with labels based on rules established previously by the merchant or another party as described herein. Such labels are then available to the transaction system to determine whether item data received in the transaction request from merchant system 108 satisfy criteria specified in any available promotion record for the application of a promotion. For example, when the transaction server 106 receives a transaction request from a merchant for the purchase of items identified in item data, the transaction server 106 may create a transaction record and associate an item in the item data with the label "SOUP." The transaction server 106 identifies, based on the user identifier received in the transaction data, that the user has received a promotional offer for $2 off of any item labeled "SOUP" within the transaction server 106 purchased at particular merchant locations. Transaction server 106 then identifies that the item data in the transaction request from merchant system 108 and stored in the resulting transaction record meets the criteria for application of the identified reward because there is an item associated with the label "SOUP," and the merchant location identified in the transaction data matches the location criteria specified in the promotion record.

The promotional offer amount in a promotion record associated with the receiving user's account in the transaction server 106, for which transaction and/or item data in a current transaction satisfies promotion criteria, may then be applied automatically by the transaction server 106 to the transaction amount. The transaction server 106 recognizes the association of a promotion amount prior to retrieving a user's financial instrument token and submitting the token and transaction to a payment-processing server 110. The transaction server 106 stores the transaction information and stores information identifying the redemption of the promotion. The transaction server 106 returns a message to the merchant system 108 approving the transaction. This approval message need not notify the merchant that any promotional offer, whether sponsored by the retail merchant or a third-party, was redeemed and applied as part of the transaction. In this way, the transaction system of the present invention enables the redemption of promotional rewards targeted to users based on item-level data, and payment for the retail transaction, simply through the user's presentation of an identifier to the merchant retail POS system 108, in a single step.

The transaction server 106 also generates a receipt message to the user, which may be communicated via email, SMS, or notification directly to a software application executing on the consumer mobile device 102, for example, the software application used to communicate the user identifier assigned by the transaction system to the merchant system 108. The receipt notification informs that user that a promotional offer was applied and that the transaction amount paid or to be paid by the user was reduced by the amount of the applied promotional offer. These receipt notification messages may be customized by the promotion sponsor or retail merchant.

Payment Facilitation. The transaction server 106 may facilitate payment of the transaction amount by the transaction server 106 to a financial account associated with the merchant system 108. If the promotional offer was sponsored by the retail merchant at which the transaction took place, the payment to the merchant financial account by the transaction server 106 may be for amount of the retail transaction less the amount of the promotional offer redeemed. If the redeemed promotion was sponsored by a party other than the retail merchant submitting the transaction request, the payment to the merchant financial account may be for the full amount of the transaction, without subtraction of the amount of the promotional offer. The transaction server 106 may then create a second transfer of funds, this time in the form of a debit to the financial account associated with the party that sponsored the redeemed promotional offer, as identified in connection with the promotion record for the redeemed offer.

The transaction server 106 may further submit a charge to the user's associated financial account, by submitting a user's financial instrument token to a payment processor server 110 in the manner disclosed above, for the transaction amount minus the amount of the redeemed promotional offer. The transaction server 106 provides digital receipts or messages to the receiving user concerning the transaction, for example, by communication to an application on the user's computing or mobile device 102 integrated with the transaction server 106 and/or using addressable information associated with the user's account, such as an email address. The message to the receiving user may identify the balance remaining on the digital gift card associated with the user's transaction system account. In this way, the transaction server 106 receives payment, from the user and in some cases a third-party promotion sponsor, equal to the amount that the transaction server 106 transfers to the financial account associated with the retail merchant system 108 that initiated the transaction request.

Earning Rewards. In various embodiments, the transaction system of the present invention permits the promotions described herein to be distributed and associated with eligible recipient user accounts dynamically, for example, upon the completion of the user of a qualifying purchase of a specified item. As an example, the promotional campaign and offer created by a promotion sponsor may condition the receipt of a promotion upon the future purchase by any user of any "COKE" item. Upon the purchase of a "COKE" item, the promotion delivered to the user presents the user with $2 off the next purchase of "CHIPS." In this example, the promotion-management server 119 may create a promotion record upon input through a web-based GUI or other interface fro the promotion sponsor reflecting the criteria for the delivery of the promotional offer to eligible recipients. However, because the delivery of the promotion is conditioned upon a future purchase, no eligible recipients are identified for the promotion. The promotion may be delivered dynamically to eligible recipients in various manners consistent with the present invention. For example, the transaction server 106, upon the receipt of transaction data from a merchant system 108 may determine whether the transaction data and/or item data received matches the criteria to trigger delivery of any promotional offers stored in a promotions database 260. Alternatively, the user record may be updated with received transactional information in the ordinary course as described herein, and the promotion-management server 119 may update its query on connection with the created promotion to identify eligible recipients and deliver promotional offer notifications as receipt eligibility criteria are satisfied in future transactions.

Data Reporting and Analytics. The transaction server 106 may provide a further benefit in that the recorded transaction information may be analyzed, individually or in the aggregate, to identify trends in consumer behavior associated with the receipt and redemption of any given promotion, or with respect to any given item contained within a merchant payment system, such as the average amount spent by users when earning or redeeming item-level promotions, additional items purchased along with a promoted item, and/or purchases of the promoted item within a period of time following the redemption of the promotion. Such information may be combined with other information within the transaction server 106 concerning user purchasing behaviors, and communicated to purchasing or receiving users, or to merchants, suppliers, or manufacturers in communication with the transaction server 106, for a variety of purposes apparent to those of skill in the art.

Importantly, as a result of consistent use of labels to define items in item-level promotions, the economics of a promotion are normalized across merchants and a degree of success can be assessed for the campaign as a whole by aggregating merchant-level success rates. Moreover, success can be assessed consistently across merchants. For example, by comparing success rates among merchants, it may be determined that consumers in warm climates are unexpectedly more responsive to a promotion seemingly unrelated to outdoor temperature. Such insights may be more easily exploited than explained, which is often the case with analytically driven assessments. Normalized comparisons provide "apples-to-apples" comparisons for metrics such as consumer responsiveness, the effect of different price points or promotion levels, etc. with merchants segmented geographically, by type, by prestige, or any other suitable criterion.

Messaging. In certain embodiments, the transaction server 106 may be configured to deliver a message to a recipient of a promotion by delivering a message to an app installed and/or executing on a consumer mobile device 102, or by email to a consumer promotion recipient who is a registered user of the transaction system or through other means such as text or SMS message. The messaging by the transaction server 106 may be configured by the promotion sponsor via a GUI used to establish and distribute a promotional offer, and may be configured to be triggered and delivered to a consumer registered with the transaction system upon satisfaction of certain criteria, including, for example, location criteria. For example, the merchant system 108, in addition to or in connection with optical scanner 112, may additionally include a transmitter 118 (i.e., a beacon) communicating an identifier via Bluetooth, BLE, radio frequency, or similar proximity wireless communication. The transmitter 118 need not be connected to or part of merchant system 108. Upon detection of a signal from transmitter 118, a software app executing or installed on a consumer mobile device 102 can communicate the identifier over an existing network to the transaction server 106 indicating that the consumer mobile device 102 is in proximity to a particular merchant location with which the transmitter 118 is associated in the memory of transaction server 106. The communication may also include a user code or token identifying the user to the transaction server 106. Alternatively, the communication from consumer mobile device 102 to transaction server 106 used to trigger a promotion marketing communication may utilize means other than a communication from a Bluetooth or BLE, transmitter 118, such as GPS data from the consumer mobile device 102, to indicate the location of the consumer near a retail merchant location at which a promotion may be redeemed. Upon receipt of that communication, the transaction server 106, through the promotion-management server 119, may match the user identifier in the user database 240, and match the merchant location within the promotions database 260 and/or item-data database 250, to determine whether the user is the recipient of any promotions that may be redeemed for items (such as a "COKE") sold at the merchant location associated with the identified transmitter 118. If a promotion is identified, the transaction server 106 may communicate a message to be displayed on a consumer mobile device 102 notifying the user that the user may redeem a promotion for a specified item by using a software app on consumer mobile device 102 to initiate a transaction at the retail merchant's POS in communication with the transaction server 106. For example, such a message may inform a user: "Pay here with the [XYZ] App and save $2 on any Coke product;" or "Buy a Coke here with the [XYZ] App and get a free bag of chips." Where there are multiple matches for messages that may be delivered to a promotion recipient, the transaction server 106 may arbitrate between available messages, including for example, by giving priority to a message of a promotion sponsor that has paid a premium fee to the system provider, by randomly selecting a message, or by selecting a message that the consumer recipient has not yet received in lieu of delivering a repeat message to the consumer. The transaction server 106 may retain data on messages delivered to registered users in this fashion, including the timing and content of messaging, in order to determine, based on a user's purchasing transaction history, whether the messaging and promotions are effective at influencing consumer behavior.

Error Correction. In connection with the digital receipts generated by transaction server 106 and communicated to a user following a transaction, for example, at a consumer mobile device 102, the system may also provide a consumer-interactive feature to permit the user to identify any apparent errors in the redemption or application of promotions to the items purchased by the user. For example, the receipt for a transaction may permit the user to click on an item in the receipt via, e.g., an embedded HTML interface, or through a native interface generated within a software app executing on consumer mobile device 102. The transaction server 106 may then query the user database 240 to identify any promotions available to that user, and display to the user a list of such promotions. By selecting one of the displayed promotions, the user can request that the transaction server

106 apply the selected promotion to an item. To the extent that the provider of transaction server 106 identifies that the consumer is correct and an available promotion was mistakenly not applied to a purchased item, the transaction server 106 can apply the promotion retroactively and prior to the submission of a charge to the user's registered payment instrument via a payment processor.

Item-Level Ordering. The transaction server 106 may provide content data, such as merchant information, location information, menu or available item information, pricing information, and/or nutritional information, to an app running on the user's device 102 to enable the app to display a listing of merchants near the user's location, or some other specified location, at which the user can create an order using the app in communication with the transaction server 106. The list may be classified for display to the user in a variety of forms, including, for example, by type of goods available, nature of the retail merchant, location, price range, user reviews, popularity, the user's past orders or other user data stored in the transaction server 106 concerning the user, or other criteria stored by or available to the transaction server 106.

The transaction server 106 may also provide information to an app identifying menu items and/or items available for purchase or order at each merchant, for example, through the use of expanding windows or new windows when the user selects or clicks on one of the merchants displayed in the list view. The transaction system 106 may acquire menu, item, pricing, nutritional, or other information concerning the goods and services offered by a merchant through various forms of communication to servers of the retail merchant or affiliated with the retail merchant that store such information and/or make the information available to consumers via web applications of the merchant or others. For example, menu information for a merchant may be stored on servers of third-party ordering aggregators, which work with multiple unaffiliated services, or on servers of a provider of a proprietary, merchant-branded website or ordering mobile app. Information may be obtained by the transaction server 106 through communication to such servers, either through publicly accessible APIs or through dedicated communications designed specifically for each third-party and authorized and permitted by such party. Menu information may also be publicly available from a number of public-facing websites. Details of an exemplary system are described, for example, in the '835 application mentioned above.

Generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. In addition, the terms like "user equipment," "mobile station," "mobile," "communication device," "access terminal," "terminal," "handset," and similar terminology, refer to a wireless device (e.g., cellular phone, smart phone, computer, PDA, set-top box, Internet Protocol Television (IPTV), electronic gaming device, printer, and so forth) utilized by a user of a wireless communication service to receive or convey data, control, voice, video, sound, gaming, or substantially any data-stream or signaling-stream. The foregoing terms are utilized interchangeably in the subject specification and related drawings. The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The processing unit that executes commands and instructions may be a general purpose computer, but may utilize any of a wide variety of other technologies including a special purpose computer, a microcomputer, minicomputer, mainframe computer, programmed microprocessor, microcontroller, peripheral integrated circuit element, a CSIC (customer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The mobile device 102 acts as a gateway for transmitting the user's data to the network 104. The mobile device 102 can support multiple communication channels for exchanging multimedia and other data with the servers 106, 110 and other devices using a Wi-Fi LAN (e.g., IEEE 802.11 standard) for Internet access, a short-range Bluetooth wireless connection for point-to-point access, and/or an NFC channel for close-proximity access.

The storage devices 238, 242 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the UNIX operating system, the LINUX operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The storage devices 238, 242 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or nonremovable memory interface.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described herein. For example, various forms of the flows shown above may be used, with steps re-ordered, added, or removed. Accordingly, other implementations are within the scope of the following claims.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for redemption of promotions in connection with retail transactions, the system comprising:
  a communications network;
  a plurality of merchant devices communicating over the communications network, each of the merchant devices being associated with a different merchant;
  a payment-processing server;
  a computer memory comprising:
    a first database of stored user information organized as user information records, each user information record corresponding to a user and containing:
      a user identifier, the user identifier being distinct to the user and comprising a seed code utilized to generate a unique mature code during a transaction time to authorize the user by a merchant POS terminal,
      information relating to at least one payment instrument associated with the user, and
      user promotion information including at least user transaction information, the user promotion information identifying promotions associated with the user;
    a second database of item-promotion information organized as item-promotion records, an item-promotion record corresponding to at least one promotion relating to an item and redeemable at merchant devices of at least two unaffiliated merchants in connection with purchase of the item; and
    a third database of item information corresponding to items available for purchase from at least two unaffiliated merchants, the item information organized as records each corresponding to an item and containing identifiers for the item available from corresponding merchants, wherein the third database of item information further including label records for identifying individual items; and
  a transaction-management server communicating over the communications network and with the databases, and comprising a computer processor coupled to one or more non-transitory data storage media that store instructions which, when executed using the computer processor, cause performing:
    obtaining, via a graphical user interface, a set of rules for application of label records to the items in the third database;
    receiving promotion information from a third-party device over the communications network, the promotion information identifying promotions redeemable at merchant devices of at least two unaffiliated merchants;

storing a promotion record with each of the promotions in the second database;

mapping the promotion record in the second database and an item record in the third database by using one or more of the label records in the third database;

during an activation phase, receiving user information for a particular user to generate a particular user identifier, wherein the particular user identifier is stored as a user information record for the particular user in the first database;

during a registration phase, receiving a payment token from the payment-processing server, wherein the payment token is stored as part of the user information record for the particular user in the first database;

during a use phase,
 receiving a request for authorization of a transaction, wherein the request includes:
  a user token that comprises a unique mature code that is generated using the particular user identifier for the transaction, the user token previously transmitted to the particular user prior to the transaction,
  item information, and
  a transaction amount;
 determining whether the received item information matches promotion information of a particular promotion record in the second database by identifying, according to the set of rules, a particular label record based on the item information and comparing the particular label record to the promotion information of the particular promotion record in the second database;
 determining whether the particular promotion record is associated with the user information record for the particular user;
 in response to determining that the particular promotion record is associated with the user information record and that the received item information matches the promotion information of the particular promotion record in the second database, applying a promotion amount indicated in the promotion information to the transaction amount; and submitting an updated transaction amount to the payment-processing server along with the information corresponding to the payment instrument associated with the user identified by the user token.

2. The system of claim 1, further comprising a promotion-management server communicating over the communications network and with the databases, and configured for (i) using the promotion information in the second database to identify promotion-eligible users in the first database, and (ii) communicating the promotion information and a user token to a mobile device of each of the promotion-eligible users.

3. The system of claim 1, wherein the promotion information comprises a dollar value, information corresponding to the identity of an item in the third database, and rules for application of the dollar value to transaction requests containing the item associated with the promotion.

4. The system of claim 3, wherein the item identity information is an item label record.

5. The system of claim 1, wherein the computer processor within the transaction management server is further configured to (i) use the promotion information to identify promotion-eligible users in the first database, and (ii) create associations between records in the first database corresponding to promotion-eligible users and promotions in the second database.

6. The system of claim 5, wherein the computer processor within the transaction management server is further configured to determine, based on receipt of the user token in connection with a transaction request communicated by a merchant device, whether the user associated therewith is also associated with one or more promotions and, if so, to apply the one or more promotions to the transaction amount.

7. The system of claim 5, wherein the identifiers are item label records, the computer processor within the transaction management server being configured to determine, based on the item label records, whether the user associated with the user token is also associated with one or more promotions that are themselves associated with the item.

8. A system for redemption of promotions in connection with retail transactions, the system comprising:
 a communications network;
 a plurality of merchant devices communicating over the communications network, each of the merchant devices being associated with a different merchant;
 a payment-processing server;
 a computer memory comprising:
  a first database of stored user information organized as user information records, each user information record corresponding to a user and containing:
   a user identifier, the user identifier being distinct to the user and comprising a seed code utilized to generate a unique mature code during a transaction time to authorize the user by a merchant POS terminal,
   information relating to at least one payment instrument associated with the user, and
   user promotion information including at least user transaction information, the user promotion information identifying promotions associated with the user;
  a second database of item-promotion information organized as item-promotion records, an item-promotion record corresponding to at least one promotion relating to an item and redeemable at merchant devices of at least two unaffiliated merchants in connection with purchase of the item; and
  a third database of item information corresponding to items available for purchase from at least two unaffiliated merchants, the item information organized as records each corresponding to an item and containing identifiers for the item available from corresponding merchants, wherein the third database of item information further including label records for identifying individual items; and
 a transaction-management server communicating over the communications network and with the databases, and comprising a computer processor coupled to one or more non-transitory data storage media that store instructions which, when executed using the computer processor, cause performing:
  obtaining, via a graphical user interface, a set of rules for application of label records to the items in the third database;
  receiving promotion information from a third-party device over the communications network, the promotion information identifying promotions redeemable at merchant devices of at least two unaffiliated merchants;

storing a promotion record with each of the promotions in the second database;

mapping the promotion record in the second database and an item record in the third database by using one or more of the label records in the third database;

during an activation phase, receiving user information for a particular user to generate a particular user identifier, wherein the particular user identifier is stored as a user information record for the particular user in the first database;

during a registration phase, receiving a payment token from the payment-processing server, wherein the payment token is stored as part of the user information record for the particular user in the first database;

during a use phase, receiving a request for authorization of a transaction without identifying a payment instrument associated with the particular user, wherein the request includes:

a user token that comprises a unique mature code that is generated using the particular user identifier for the transaction, the user token previously transmitted to the particular user prior to the transaction, item information, and a transaction amount;

determining whether the received item information matches promotion information of a particular promotion record in the second database by identifying, according to the set of rules, a particular label record based on the item information and comparing the particular label record to the promotion information of the particular promotion record in the second database;

determining whether the particular promotion record is associated with the user information record for the particular user;

in response to determining that the particular promotion record is associated with the user information record and that the received item information matches the promotion information of the particular promotion record in the second database, applying a promotion amount indicated in the promotion information to the transaction amount; and submitting an updated transaction amount to the payment-processing server along with the information corresponding to the payment instrument associated with the user identified by the user token.

9. The system of claim 8, wherein the computer processor within the transaction management server is further configured:

utilizing the seed code, generating a specific mature code that can be captured by a merchant point-of-sale (POS) device, the specific mature code mapped to user identity information of a specific user identifier and stored only in the first database and containing no user payment token information or user payment instrument data, wherein the seed code is used as a seed to generate multiple mature codes.

10. The system of claim 9, wherein each of newly-generated mature codes is pushed to user equipment on a periodical, per transaction, or time-out basis.

* * * * *